United States Patent
Matsuoka

(10) Patent No.: US 12,399,386 B2
(45) Date of Patent: Aug. 26, 2025

(54) SPECTACLE LENS AND DESIGN METHOD THEREOF

(71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 378 days.

(21) Appl. No.: 18/026,551

(22) PCT Filed: Jul. 20, 2021

(86) PCT No.: PCT/JP2021/027056
§ 371 (c)(1),
(2) Date: Mar. 15, 2023

(87) PCT Pub. No.: WO2022/059333
PCT Pub. Date: Mar. 24, 2022

(65) Prior Publication Data
US 2023/0333411 A1 Oct. 19, 2023

(30) Foreign Application Priority Data
Sep. 18, 2020 (JP) ................................. 2020-157037

(51) Int. Cl.
*G02C 7/06* (2006.01)
(52) U.S. Cl.
CPC ........... *G02C 7/06* (2013.01); *G02C 2202/20* (2013.01)
(58) Field of Classification Search
CPC .......... G02C 7/06; G02C 7/028; G02C 7/022; G02C 2202/20; G02C 2202/24
(Continued)

(56) References Cited

U.S. PATENT DOCUMENTS 9,625,739 B2 * 4/2017 Brennan ................ A61F 2/1451
10,012,848 B2 * 7/2018 Brennan ................ G02C 7/061
(Continued)

FOREIGN PATENT DOCUMENTS

JP 2020500328 A 1/2020
JP 2020106712 A 7/2020
(Continued)

OTHER PUBLICATIONS

EP21869020.4, "Extended European Search Report", Sep. 19, 2024, 13 pages.
(Continued)

*Primary Examiner* — William R Alexander
(74) *Attorney, Agent, or Firm* — Oliff PLC

(57) ABSTRACT

Provided are a spectacle lens and a technique associated therewith, wherein, when $\lambda$ is a wavelength, r is a ratio of a total area of defocus regions to an overall area in plan view of a portion in which a plurality of defocus regions are provided in the spectacle lens, w is an amount of progression of a wavefront in each of the defocus regions relative to a base region, an average value of $\cos(2\pi w/\lambda)$ in one defocus region is obtained in each of the plurality of defocus regions, $c(\lambda)$ is a gross average of the plurality of average values, an average value of $\sin(2\pi w/\lambda)$ in one defocus region is obtained in each of the plurality of defocus regions, $s(\lambda)$ is a gross average of the plurality of average values, and $f(\lambda)$ is equal to $\{1-r+r\cdot c(\lambda)\}^2+\{s(\lambda)\}^2$, a sign of $\{f(\lambda \times 1.01)-f(\lambda)\}$ is inverted at least once when the wavelength $\lambda$ is increased within a range of $0.45\ \mu m \leq \lambda \leq 0.65\ \mu m$.

20 Claims, 7 Drawing Sheets

(58) Field of Classification Search
USPC .................................................. 351/159.42
See application file for complete search history.

(56) References Cited

U.S. PATENT DOCUMENTS

| | | | | |
|---|---|---|---|---|
| 10,877,294 | B2* | 12/2020 | Lau ........................... | G02C 7/06 |
| 10,884,264 | B2* | 1/2021 | Hones ..................... | G02C 7/027 |
| 10,948,744 | B1* | 3/2021 | Guillot .................... | G02C 7/086 |
| 11,067,832 | B2* | 7/2021 | Guillot .................... | G02C 7/066 |
| 11,073,704 | B2* | 7/2021 | Guillot ..................... | G02B 3/04 |
| 2016/0054587 | A1* | 2/2016 | Brennan ................. | G02C 7/041 |
| | | | | 623/6.11 |
| 2017/0131567 | A1 | 5/2017 | To et al. | |
| 2017/0146820 | A1* | 5/2017 | Brennan ................. | G02C 7/06 |
| 2019/0064542 | A1 | 2/2019 | Chen et al. | |
| 2019/0235279 | A1* | 8/2019 | Hones ..................... | G02C 7/10 |
| 2020/0073147 | A1 | 3/2020 | Bakaraju et al. | |
| 2020/0159044 | A1* | 5/2020 | To ............................ | G02C 7/06 |
| 2021/0116720 | A1* | 4/2021 | Guillot ................... | G02C 7/061 |
| 2021/0199990 | A1* | 7/2021 | Guillot ................... | G02C 7/086 |
| 2021/0286195 | A1 | 9/2021 | Matsuoka | |
| 2022/0057293 | A1 | 2/2022 | Qi et al. | |

FOREIGN PATENT DOCUMENTS

| | | |
|---|---|---|
| JP | 2020527735 A | 9/2020 |
| WO | 2019206569 A1 | 10/2019 |
| WO | 2020138127 A | 7/2020 |

OTHER PUBLICATIONS

Howarth et al., "The longitudinal chromatic aberration of the human eye, and its correction", Vision research 26.2, 1986, 361-366.
PCT/JP2021/027056, "International Preliminary Report on Patentability", Mar. 30, 2023, 5 pages.
PCT/JP2021/027056, "International Search Report", Sep. 7, 2021, 3 pages.

* cited by examiner

COMPARATIVE EXAMPLE 1

EXAMPLE 1

EXAMPLE 2

SPECTACLE LENS AND DESIGN METHOD THEREOF

CROSS-REFERENCE TO RELATED APPLICATIONS

This application is the National Stage of International Application No. PCT/JP2021/027056, filed on Jul. 20, 2021, which claims priority to Japanese Patent Application No. 2020-157037, filed Sep. 18, 2020, and the contents of which are incorporated herein by reference.

TECHNICAL FIELD

The present disclosure relates to a spectacle lens and a design method thereof.

BACKGROUND ART

As a spectacle lens for suppressing the progression of refractive errors such as myopia, a spectacle lens is available that has island-like regions formed therein, the island-like regions each having a positive refractive power relative to a plurality of prescription refractive powers on the lens (see e.g., Patent Document 1). Such an island-like region is hereinafter referred to as a defocus region.

With a spectacle lens having this configuration, of light beams that enter from an object-side surface and exit from an eyeball-side surface, light beams passing through portions other than the defocus regions are focused on the retina of the wearer, whereas light beams passing through portions constituting the defocus regions are focused at a position in front of the retina, whereby the progression of myopia is suppressed.

In the present specification, a forward direction in which an object to be viewed is present in an optical axis direction is referred to as a "front side", and a depth direction that is opposite to the front side and extends rearward in the optical axis direction, or in other words, a direction extending from the spectacle lens toward an eyeball is referred to as a "back side".

Patent Document 1 describes that, in a region in which second refractive regions (defocus regions) and a first refractive region (a base region that achieves a prescription refractive power) are formed in a mixed manner, the ratio of a total area of the second refractive regions is set to be 20 to 60% with respect to a total area of the second refractive regions and the first refractive region. According to the document, this makes it possible to ensure the function for suppressing the progression of myopia, while maintaining sufficient visibility, thus achieving good wearability.

CITATION LIST

Patent Document

Patent Document 1: US 2017/0131567A

SUMMARY OF DISCLOSURE

Technical Problem

Patent Document 1 suggests that, based on a technical idea that the defocus regions are responsible for the myopia progression suppressing function, and the base region is responsible for the function relating to visibility, the area ratio between the defocus regions and the base region is set so as to realize the two functions. That is, the aforementioned area ratio is set based on the idea that the ratio between a "spot intensity formed on the retina" and a "sum of spot intensities formed at focal points in the defocus regions" corresponds to the ratio between the area of the base region and the area of the defocus regions.

As a result of investigation by the present inventor, it has been found that the visibility, for which the base region is supposed to be responsible, is also affected by the defocus regions.

Specifically, it has been found that the light amount of a spot formed when a light beam that has passed through the base region forms a focal point on the retina of the wearer is affected by the area of the defocus regions and the height of the defocus regions (corresponding to minute protrusions described in Patent Document 1) with respect to the shape of the base.

As used herein a "spot" refers to a range extending from the peak to the first dark ring of a distribution of light formed on a retina as a result of light at an object point having passed through a part of a spectacle lens and an eyeball optical system. In addition, a sum of energy in the aforementioned range is referred to as a "spot intensity". However, in most cases, a "spot intensity" is in a proportional relationship with a spot peak intensity. Accordingly, the spot intensity will be in some cases discussed in place of the peak intensity.

Hereinafter, a "spot formed when a focal point is formed at a focal point of a base region and on a retina of a wearer" is also referred to as a "spot at a focal point on a base surface".

A "height of a protruding region" is also referred to as a "sag amount". A sag amount refers to a maximum distance to a defocus region (protruding region, or recessed region described later) from a tangent plane of a base region when no defocus region is present, to a defocus region (e.g., a distance from the tangent plane to a vertex of the protruding region or recessed region).

The fact that the spot intensity at a focal point on the base surface is affected by the sag amount means that the spot intensity at a focal point on the base surface is affected by the direction of incidence of light beams. The reason for this is that when a light beam is incident obliquely (i.e., when a wearer sees with peripheral vision rather than frontal vision), the distance passed by the light beam increases, resulting in increased contribution to progression of the wavefront. This is referred to as an increase in an "apparent sag amount". When a light beam is incident obliquely, the spot intensity is affected in the same manner as it is affected when the sag amount is changed.

FIG. 1 is a plot showing a relationship between an incident angle θ (horizontal axis: unit [degrees]) of a light beam and an apparent sag amount/sag amount ratio (vertical axis).

FIG. 2 is a plot showing a relationship between a dimension (horizontal axis: unit [mm]) on a spectacle lens under conditions of Example 1 described below when an in-focus position, on a retina of a wearer, of a light beam that has passed through the base region is zero, and an intensity ratio (vertical axis) when the spot intensity at a focal point on a base surface with no defocus region formed thereon is 1.

As shown in FIG. 1, when a light beam is incident obliquely from a medium having a refractive index of 1 onto a medium having a refractive index of N, the apparent sag amount is (N cos θ'−cos θ)/(N−1) times the actual sag amount (hereinafter simply referred to as a "sag amount"). θ is the incident angle of the light beam, and θ' is the exit angle of the light beam. For example, for an incident angle of 30 degrees, the apparent sag amount is 1.1 greater than the sag amount.

In the actual design, a sag amount is set such that an apparent sag amount has a desired value at an incident angle in a standard usage (hereinafter referred to as a "standard incident angle"). The apparent sag amount at the standard incident angle in this case is referred to as a "standard apparent sag amount". For example, when a "standard apparent sag amount" is set at an incident angle of 30 degrees, the apparent sag amount when the spectacle lens is used in a situation where a light beam is incident at an incident angle of 0 degrees is smaller than the "standard apparent sag amount" by 10%.

The dotted line in FIG. 2 indicates a plot for a case where no protruding region is provided, and the spot intensity is reduced to the solid line (design value) as a result of providing protruding regions.

The dotted line in FIG. 2 shows a simulation result indicating a spot intensity distribution when light beams are incident at 30 degrees. The dashed line in FIG. 2 shows a simulation result indicating a spot intensity distribution at an incident angle of 0 degrees when the apparent sag amount is reduced by 10%. Since the spectacle lens is designed for a standard incident angle of 30 degrees, if a light beam is incident at an incident angle of 0 degrees, the apparent sag amount is smaller than the standard apparent sag amount by 10%. It can be confirmed that there is a difference in spot intensity between the two simulation results.

When a hard coating layer is formed for the protruding region, the protruding region is leveled. As a result, the sag amount from the base region for which a hard coating layer is also formed tends to be reduced. In that case as well, change occurs in the spot intensity at the focal point on the base surface.

In any case, as a result of investigation by the present inventor, it has been found that, as shown in FIG. 2, the spot intensity at a focal point on the base surface is affected by the actual sag amount or apparent sag amount of the defocus regions.

Making the sag amount of the defocus regions constant means limiting the incident angle of light beams only to a standard angle, or precisely keeping the sag amount as designed even after forming the hard coating layer. This cannot be considered as realistic measures.

An aspect of an embodiment of the present disclosure is to provide a technique by which the spot intensity at a focal point on a base surface to be less likely to be affected by change in the sag amount of defocus regions.

Solution to Problem

A first aspect of the present disclosure is
a spectacle lens including:
a base region primarily responsible for causing a light beam that has entered from an object-side surface to exit from an eyeball-side surface and to be converged onto a retina through an eyeball; and
a plurality of defocus regions in contact with the base region and primarily responsible for causing the light beam to be converged on a front side or a back side of the retina,
wherein, when $\lambda$ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region,
an average value of $\cos(2\pi w/\lambda)$ in one defocus region is obtained in each of the plurality of defocus regions, $c(\lambda)$ is a gross average of the plurality of average values,
an average value of $\sin(2\pi w/\lambda)$ in one defocus region is obtained in each of the plurality of defocus regions, $s(\lambda)$ is a gross average of the plurality of average values, and $f(\lambda)$ is equal to $\{1-r+r\cdot c(\lambda)\}^2 + \{s(\lambda)\}$, a sign of $\{f(\lambda \times 1.01) - f(\lambda)\}$ is inverted at least once when the wavelength $\lambda$ is increased within a range of 0.45 µm$\leq\lambda\leq$0.65 µm.

A second aspect of the present disclosure is the aspect according to the first aspect,
wherein Equation 1 is satisfied when $\lambda a=0.45$ µm, and $\lambda b=0.65$ µm are set in Equation 1:

$$\{f(\lambda a \times 1.01) - f(\lambda a)\} \times \{f(\lambda b \times 1.01) - f(\lambda b)\} < 0 \quad \text{(Equation 1)}$$

A third aspect of the present disclosure is the aspect according to the second aspect,
wherein Equation 1 is satisfied when $\lambda a=0.50$ µm, and $\lambda b=0.60$ µm are set in Equation 1.

A fourth aspect of the present disclosure is the aspect according to any one of the first to third aspects,
wherein a minimum $f(\lambda)$/maximum $f(\lambda)$ ratio is 0.70 to 1.00 within the range of 0.45 µm$\leq\lambda\leq$0.65 µm.

A fifth aspect of the present disclosure is the aspect according to any one of the first to fourth aspects,
wherein at least half the number of the plurality of defocus regions are arranged with a same periodicity in plan view.

A sixth aspect of the present disclosure is the aspect according to the fifth aspect,
wherein at least half the number of the plurality of defocus regions are in a hexagonal arrangement.

A seventh aspect of the present disclosure is the aspect according to any one of the first to sixth aspects,
wherein the spectacle lens is a myopia progression suppression lens or a hypermetropia progression suppression lens.

An eighth aspect of the present disclosure is
a design method of a spectacle lens including:
a base region primarily responsible for causing a light beam that has entered from an object-side surface to exit from an eyeball-side surface and to be converged onto a retina through an eyeball; and
a plurality of defocus regions in contact with the base region and primarily responsible for causing the light beam to be converged on a front side or a back side of the retina,
wherein, when $\lambda$ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region,
an average value of $\cos(\lambda \pi w/\lambda)$ in one defocus region is obtained in each of the plurality of defocus regions, $c(\lambda)$ is a gross average of the plurality of average values, an average value of sin (λπw/λ) in one defocus region is obtained in each of the plurality of defocus regions, s(λ) is a gross average of the plurality of average values, and $f(\lambda)$ is equal to $\{1-r+r\cdot c(\lambda)\}^2+\{s(\lambda)\}^2$, the method including:

inverting a sign of $\{f(\lambda\times1.01)-f(\lambda)\}$ at least once when the wavelength λ is increased within a range of 0.45 μm≤λ≤0.65 μm.

Other aspects of the present disclosure that can be combined with the above-described aspects are as follows.

The sign of $\{f(\lambda\times1.01)-f(\lambda)\}$ may be changed (including being changed from positive or negative to zero) at least once when the wavelength λ is increased within the range of 0.45 μm≤λ≤0.65 μm.

When the wavelength is 0.45 μm, it is preferable that the slope of the plot is negative when the wavelength is increased. When the wavelength is 0.65 μm, it is preferable that the slope of the plot is inverted to positive when the wavelength is increased.

The maximum value of the absolute value of w/λ may be less than 2 (more certainly less than 1.5).

The spectacle lens may be a spectacle lens including:

a base region that causes a light beam that has entered from an object-side surface to exit from an eyeball-side surface and to be converged onto a retina through an eyeball; and a plurality of defocus regions in contact with the base region and having a property such that a light beam passing through at least part of the defocus regions enters the retina as divergent light, wherein, when λ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region, an average value of cos (2πw/λ) in one defocus region is obtained in each of the plurality of defocus regions, c(λ) is a gross average of the plurality of average values, an average value of sin (2πw/λ) in one defocus region is obtained in each of the plurality of defocus regions, s(λ) is a gross average of the plurality of average values, and $f(\lambda)$ is equal to $\{1-r+r\cdot c(\lambda)\}^2+\{s(\lambda)\}^2$, a sign of $\{f(\lambda\times1.01)-f(\lambda)\}$ is changed at least once when the wavelength λ is increased within a range of 0.45 μm≤λ≤0.65 μm.

The spectacle lens may be a spectacle lens that satisfies at least any of the following conditions.

[Condition 1] The sign of $\{f(\lambda\times1.01)-f(\lambda)\}$ is inverted at least once when the wavelength λ is increased within the range of 0.45 μm≤λ≤0.65 μm.

[Condition 2] Within the range of 0.45 μm≤λ≤0.65 μm, the wavelength λ includes a range where $\{f(\lambda\times1.01)-f(\lambda)\}=0$ is satisfied, and the minimum f(λ)/maximum f(λ) ratio is 0.70 to 1.00.

The interval between the defocus regions may be 1.0 to 2.0 mm. The number of defocus regions may be 100 to 100000.

The diameter of each of the defocus regions in plan view is preferably about 0.6 to 2.0 mm. The sag amount (protruding height, protruding amount) of each of the defocus region is about 0.1 to 10 μm, preferably 0.4 to 2.0 μm. The protruding region has a radius of curvature of about 50 to 250 mm, preferably a spherical radius of curvature of about 86 mm.

Specific numerical values of the defocus power in each of defocus region are not limited. For example, it is preferable that the minimum value of the defocus power provided by the defocus region on the spectacle lens is within the range of 0.5 to 4.5 D, and the maximum value thereof is within the range of 3.0 to 10.0 D. The difference between the maximum value and the minimum value is preferably within the range of 1.0 to 5.0 D.

Advantageous Effects of Disclosure

According to an embodiment of the present disclosure, the spot intensity at a focal point on a base surface is less likely to be affected by change in the sag amount of defocus regions.

DESCRIPTION OF EMBODIMENTS

Figure 1:
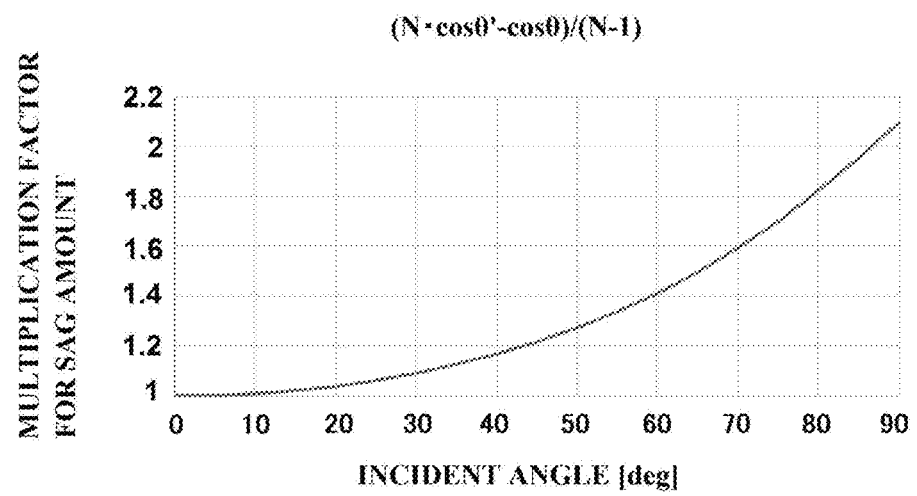
FIG. 1 is a plot showing a relationship between an incident angle θ (horizontal axis: unit [degrees]) of a light beam and an apparent sag amount/sag amount ratio (vertical axis).

Hereinafter, an embodiment of the present disclosure will be described. The following description based on the drawings is merely illustrative, and the present disclosure is not limited to the aspects that are described as examples. For the details not described in the present specification, the descriptions of Patent Document 1 are all incorporated herein. For the details (in particular, the details regarding the manufacturing method) not described in Patent Document 1, the descriptions of WO2020/004551 are all incorporated herein. If there is any inconsistency between the details described in Patent Document 1 and the details described in WO2020/004551, the descriptions of WO2020/004551 will prevail.

The spectacle lens as described herein has an object-side surface and an eyeball-side surface. The term "object-side surface" refers to a surface located on the object side when a spectacle including a spectacle lens is worn by a wearer, and the term "eyeball-side surface" refers to a surface located opposite thereto, or in other words, on the eyeball side when a spectacle including the spectacle lens is worn by a wearer. This relationship also applies to a lens substrate from which the spectacle lens is formed. That is, the lens substrate also has an object-side surface and an eyeball-side surface.

The term "to" as used herein refers to a predetermined value or more and a predetermined value or less.

<Spectacle Lens>

A spectacle lens according to an aspect of the present disclosure includes a base region primarily responsible for causing a light beam that has entered from an object-side surface to exit from an eyeball-side surface and to be converged onto a retina through an eyeball, and a plurality of defocus regions in contact with the base region and primarily responsible for causing the light beam to be converged at the front or the back of the retina. The reason that the term "primarily" is used here is that the functions of the base region and the defocus regions of a spectacle lens according to an aspect of the present disclosure are not entirely independent of each other since the spectacle lens uses a diffraction phenomenon, for example.

A base region is a portion having a shape that can achieve a prescription refractive power of a wearer in terms of geometrical optics, and corresponds to the first refractive region of Patent Document 1.

A defocus region is a region in which, in terms of geometrical optics, at least a portion of the region does not allow light to be condensed at a position at which light is condensed by the base region. A defocus region is a portion corresponding to a minute protrusion of Patent Document 1. As in the case of the spectacle lens of Patent Document 1, a spectacle lens according to an aspect of the present disclosure is a myopia progression suppression lens. As in the case of the minute protrusions of Patent Document 1, a plurality of defocus regions according to an aspect of the present disclosure may be formed on at least one of the object-side surface and the eyeball-side surface of the spectacle lens. The present specification mainly illustrates a case where a plurality of defocus regions are provided only on the object-side surface of the spectacle lens. Hereinafter, unless otherwise specified, the defocus regions are protruding regions.

Figure 10:
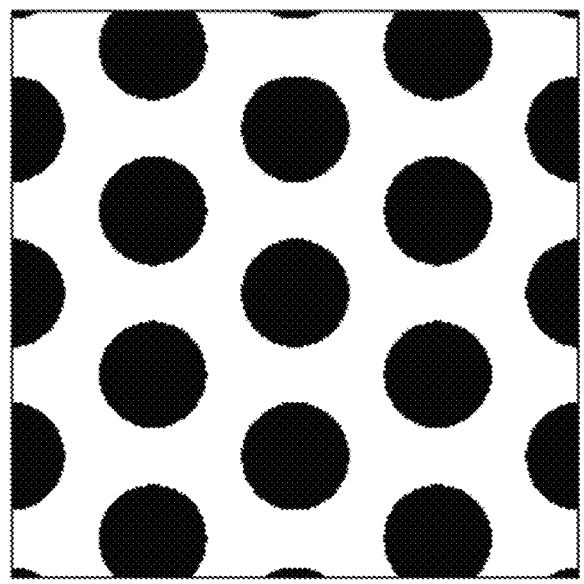
FIG. 10 is a schematic diagram, in plan view, of a portion in which defocus regions (in black in the drawing) are formed in the spectacle lens of Example 2.

The defocus regions may be formed at a central portion of the spectacle lens as depicted in FIG. 10 of Patent Document 1, or no defocus regions may be formed at a central portion of the spectacle lens as depicted in FIG. 1 of Patent Document 1. In an aspect of the present disclosure, a case where no defocus regions are formed at a central portion of the spectacle lens is illustrated.

The term "central portion of a spectacle lens" refers to a geometrical center, an optical center, or a centering center of the spectacle lens and the vicinity thereof. The present specification illustrates a case where the central portion refers to a centering center and the vicinity thereof. The centering center is also referred to as a lens center. The present specification illustrates a case where the line of sight of a wearer passes through the lens center when the wearer is looking forward.

In addition, an aspect of the present disclosure satisfies the following conditions.

When $\lambda$ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region, an average value of $\cos(2\pi w/\lambda)$ in one defocus region is obtained in each of the plurality of defocus regions, $c(\lambda)$ is a gross average of the plurality of average values, an average value of $\sin(2\pi w/\lambda)$ in one defocus region is obtained in each of the plurality of defocus regions, $s(\lambda)$ is a gross average of the plurality of average values, and $f(\lambda)$ is equal to $\{1-r+r\cdot c(\lambda)\}^2 + \{s(\lambda)\}^2$, Equation 1 is satisfied when $\lambda a = 0.45\ \mu m$, and $\lambda b = 0.65\ \mu m$ are set in Equation 1:

$$\{f(\lambda a \times 1.01) - f(\lambda a)\} \times \{f(\lambda b \times 1.01) - f(\lambda b)\} < 0 \quad \text{(Equation 1)}$$

The denominator of the ratio r is an overall area, in plan view, of a portion of the spectacle lens in which the plurality of defocus regions are provided. The overall area is the area of an annular portion sandwiched between a circle having a radius r1 corresponding to the distance from the lens center to a defocus region that is closest to the lens center, and a circle having a radius r2 corresponding to the distance from the lens center to a defocus region that is most distant from the lens center. Note that if the defocus regions are formed at the lens center, the above-described overall area is the area of a circular portion.

Approximately circular defocus regions may be arranged in an island-like configuration (i.e., so as to be spaced apart from each other without being adjacent to each other) around the central portion of the spectacle lens equidistantly in the circumferential direction and the axial direction. As an example of the arrangement of the defocus regions in plan view, the defocus regions may be arranged independent of each other in a dispersed manner such that the center of each protruding region is located at a vertex of an equilateral triangle (the center of each defocus region is disposed at a vertex of a honeycomb structure). This arrangement is also referred to as a "hexagonal arrangement".

Figure 9:
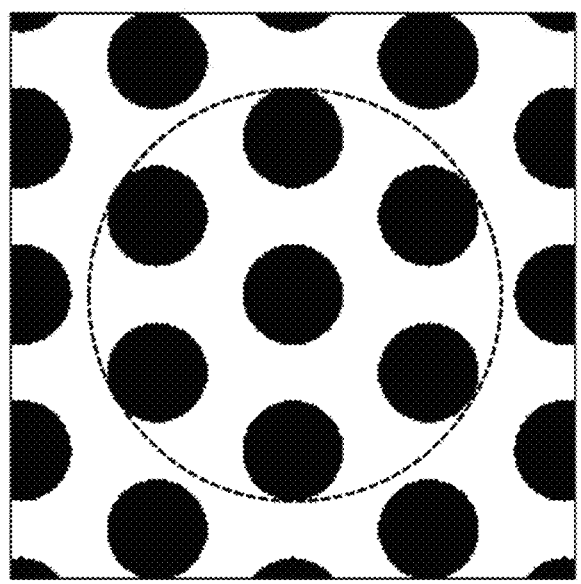
FIG. 9 is a schematic diagram, in plan view, of a portion in which defocus regions (in black in the drawing) are formed in the spectacle lens of Example 1.

In this case, in order to obtain a ratio r simply, the area of a true circle in a state in which a total of seven defocus regions (one defocus region at the center, and six defocus regions therearound) in a hexagonal arrangement fit in the true circle in a closest-packed state (e.g., inside the dotted line of FIG. 9, which is illustrated later) may be regarded as the above-described overall area, and a total area of the defocus regions may be regarded as the area of the seven defocus regions.

In the case of employing an arrangement other than the hexagonal arrangement, defocus regions may be selected from the plurality of defocus regions such that a maximum number of defocus regions can fit in a true circle in a closest-packed state, the area of that true circle may be regarded as the above-described overall area, and a total area of the defocus regions that fit in the true circle may be regarded as the area of the defocus regions.

The term "wavefront" as used herein refers to a wavefront of a light beam that passes through a spectacle lens and whose diameter is defined by a pupil. The method for determining the amount of progression w of a wavefront in each defocus region relative to the base region is not particularly limited, and the determination may be performed by a simulation process using wave-optical calculation, for example.

By satisfying the conditions of Equation 1 above, the spot intensity at a focal point on the base surface is less likely to be affected by change in the sag amount of the defocus regions. That is, even if the sag amount of the defocus regions changes, change in the spot intensity at a focal point on the base surface is reduced (this property is referred to as "robust"). The following describes the findings that led to this idea.

First, the spot intensity at a focal point on the base surface is discussed. The method for obtaining the spot intensity is not limited, and it is possible to use a ray tracing method, and evaluate the spot intensity using a PSF (Point spread function).

When w is the amount of progression of a wavefront in each of the defocus regions relative to the base region, and P is the range that beam coordinates (x, y) passing through a pupil can take, the spot intensity $f(\lambda)$ at a focal point on the base surface can be expressed as follows.
[Math. 1]

$$f(\lambda) = \left(\iint_P \cos\frac{2\pi w(x,y)}{\lambda} dxdy\right)^2 + \left(\iint_P \sin\frac{2\pi w(x,y)}{\lambda} dxdy\right)^2 \quad \text{(Equation 2)}$$

On the base region, w=0. In that case, cos (2πw/λ) is 1, and sin (2πw/λ) is 0. Then, the base region and the defocus regions are separated from each other (of the above-described P, the defocus region is referred to as Ps) to formulate an expression, which can be expressed as follows. The preceding parentheses on the right-hand side of the following expression represents an integral value for the base region, and the subsequent parentheses on the right-hand side represents an integral value for the defocus region.
[Math. 2]

$$f(\lambda) = \left(1 - r + \iint_P \cos\frac{2\pi w(x,y)}{\lambda} dxdy\right)^2 + \left(\iint_P \sin\frac{2\pi w(x,y)}{\lambda} dxdy\right)^2 \quad \text{(Equation 3)}$$

An average value of cos (2πw/λ) in one defocus region is obtained in each of the plurality of defocus regions, a gross average of the plurality of average values is defined as c(λ), an average value of sin (2πw/λ) in one defocus region is obtained in each of the plurality of defocus regions, and a gross average of the plurality of average values is defined as s(λ).

An average value of cos (2πw/λ) and an average value of sin (2πw/λ) in one defocus region (protruding region) are obtained as amounts equivalent to amounts per unit area of integral values of cos (2πw/λ) and sin (2πw/λ), which vary one minute location to another in one defocus region (protruding region). Then, these two types of average values are obtained for defocus regions other than the aforementioned defocus region (protruding region).

Then, by calculating a gross average of the plurality of average values of cos (λπw/N), c(λ) that is equivalent to the amount per unit area of the integral value of cos (2πw/λ) in the plurality of defocus regions can be obtained. By calculating a gross average of the plurality of average values of sin (2πw/λ), s(λ) that is equivalent to the amount per unit area of the integral value of cos (2πw/λ) in the plurality of defocus regions can be obtained. Also, f(λ) can be expressed as follows.

$$f(\lambda) = \{1 - r + r \cdot c(\lambda)\}^2 + \{s(\lambda)\}^2 \quad \text{(Equation 4)}$$

For the sake of convenience of description, in an aspect of the present disclosure, a case is illustrated where an average value of cos (2πw/λ) of one defocus region (protruding region) is equal to a gross average of cos (2πw/λ) of all defocus regions, and an average value of sin (2πw/λ) of one defocus region (protruding region) is equal to a gross average of sin (2πw/λ) of all defocus regions.

Here, if λ is multiplied by 1.01, Equation 3 above can be expressed as follows.
[Math. 3]

$$f(1.01\lambda) = \left(1 - r + \iint_P \cos\frac{2\pi w(x,y)}{1.01\lambda} dxdy\right)^2 + \left(\iint_P \sin\frac{2\pi w(x,y)}{1.01\lambda} dxdy\right)^2 \quad \text{(Equation 5)}$$

The expression inside the integration of Equation 5 above is equivalent to that in a state in which w (x, y) is multiplied by 1/1.01 (see Equation 6 below).
[Math. 4]

$$f(1.01\lambda) = \left(1 - r + \iint_P \cos\frac{2\pi w(x,y)/1.01}{\lambda} dxdy\right)^2 + \left(\iint_P \sin\frac{2\pi w(x,y)/1.01}{\lambda} dxdy\right)^2 \quad \text{(Equation 6)}$$

The absolute value of the amount of progression w of a wavefront in each of the defocus regions relative to the base region increases with an increase in the sag amount since the distance by which a light beam passes through the defocus region increases, and the absolute value decreases with a decrease in the sag amount.

That is, the tendency of change in the spot intensity f(λ) at a focal point on the base surface in response to change in the amount of progression w of a wavefront in each of the defocus regions (i.e., the sag amount of the defocus region) relative to the base region is similar to the tendency of change in the spot intensity f(λ) at a focal point on the base surface in response to change in the wavelength λ. An aspect of the present disclosure focuses on this similarity in tendency, and grasps the tendency of change in the spot intensity f(λ) corresponding to change in the wavelength λ, thereby grasping the tendency of change in the spot intensity f(λ) corresponding to change in the sag amount of the defocus region.

As a result, with a spectacle lens that undergoes a small change in the spot intensity f(λ) at a focal point on the base surface in response to change in the wavelength λ, the change in the spot intensity at a focal point on the base surface is reduced even if the sag amount of the defocus region changes as a result of oblique incidence of a light beam, or formation of a hard coating layer.

As will be discussed in the following example sections, the present inventor has found that, in order to reduce the change in the spot intensity f(λ) at a focal point on the base surface in response to change in the wavelength λ, the spot intensity f(λ) at a focal point on the base surface should be prevented from being monotonously increased or monotonously decreased relative to the wavelength λ. Based on this finding, Equation 1 above (shown below again) is attained.

$$\{f(\lambda a \times 1.01) - f(\lambda a)\} \times \{f(\lambda b \times 1.01) - f(\lambda b)\} < 0 \quad \text{(Equation 1)}$$

Equation 1 above means that the sign of a slope of the spot intensity f(λa) at a focal point on the base surface when the wavelength is increased from the wavelength λa and the sign of a slope of the spot intensity f(λb) at a focal point on the base surface when the wavelength is increased from the wavelength λb are opposite.

FIGS. 3 to 6 are plots showing change in a spot intensity f(λ) (vertical axis: normalized with 1 being the spot peak intensity at a focal point on a base surface assuming that there is no defocus region) at a focal point on a base surface, with respect to the wavelength λ (horizontal axis: unit [μm]) in spectacle lenses of Comparative Example 1, Comparative Example 2, Example 1, and Example 2 in this order.

Figure 2:
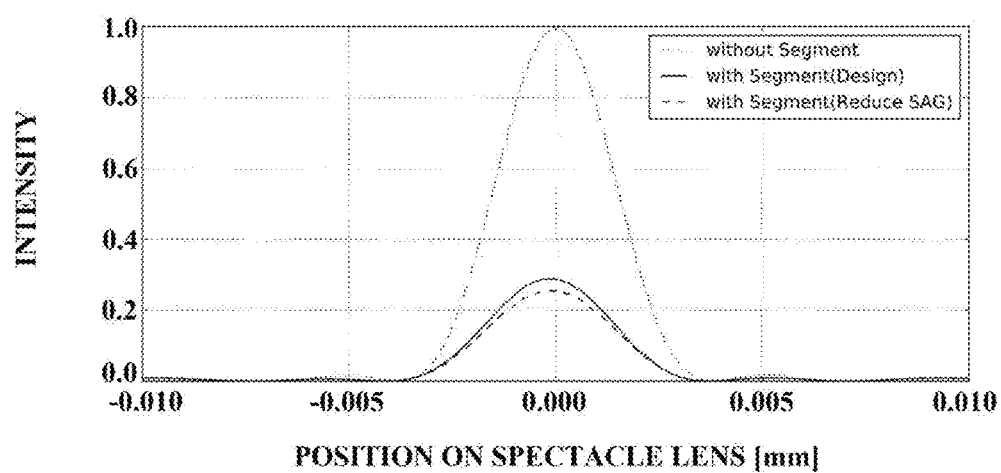
FIG. 2 is a plot showing a relationship between a dimension (horizontal axis: unit [mm]) on a spectacle lens under conditions of Example 1 when an in-focus position, on a retina of a wearer, of a light beam that has passed through a base region is zero, and an intensity ratio (vertical axis) when the spot intensity at a focal point on a base surface with no defocus region formed thereon is 1.

The solid lines in FIGS. 3 to 6 are plots of the design value. The dashed lines in FIGS. 3 to 6 are plots assuming, as in the case of the dashed line in FIG. 2, that, when the "standard apparent sag amount" is set at an incident angle of 30 degrees, the apparent sag amount when the spectacle lens is used in a situation where a light beam is incident at an incident angle of 0 degrees is smaller than the "standard apparent sag amount" by 10%.

When a hard coating layer is formed for the protruding regions, the protruding regions are leveled. As a result, the sag amount from the base region for which a hard coating layer is also formed tends to be reduced. In that case as well, change occurs in the spot intensity at the focal point on the base surface.

Equation 1 above indicates that, if $\{f(\lambda a \times 1.01) - f(\lambda a)\}$ is positive, the slope of the plot on the vertical axis and the horizontal axis of each of FIGS. 3 to 6 becomes positive when the wavelength increases. Conversely, Equation 1 above indicates that, if $\{f(\lambda a \times 1.01) - f(\lambda a)\}$ is negative, the slope of the plot on the vertical axis and the horizontal axis of each of FIGS. 3 to 6 becomes negative when the wavelength increases.

That is, Equation 1 above indicates that the slope of the plot in the vicinity of the wavelength λa and the slope of the plot in the vicinity of the wavelength λb are inverted in sign, or that at least one of the slopes becomes zero.

The spot intensity f(λ) (vertical axis: normalized with 1 being the spot intensity at a focal point on a base surface assuming that there is no defocus region) at a focal point on a base surface, with respect to the wavelength λ (horizontal axis: unit [μm]) in the spectacle lenses of Comparative Examples 1 and 2 described below changes so as to monotonously increase or monotonously decrease, and therefore the degree of the change is significant.

On the other hand, the spot intensity f(λ) at a focal point on a base surface, with respect to the wavelength λ in the spectacle lenses of Examples 1 and 2, to which an aspect of the present disclosure is applied, changes so as to increase and thereafter decrease, or to decrease and thereafter increase with an increase in the wavelength. Accordingly, the degree of the change is smaller than those for Comparative Examples 1 and 2.

For Examples 1 and 2 described below, Equation 1 is satisfied when λa=0.45 μm, and λb=0.65 μm are set in Equation 1. More preferably, Equation 1 is satisfied when λa=0.50 μm, and λb=0.60 μm are set in Equation 1. Indeed, for Example 1, which satisfies this preferable setting, the change in the spot intensity f(λ) at a focal point on the base surface is very small even if the wavelength changes.

The reason that λa=0.45 μm, and λb=0.65 μm are set is that these values define a wavelength range in which the sensitivity to the retina is high, among visible light wavelengths. In particular, where λa=0.50 μm, and λb=0.60 μm, a wavelength range (0.55 μm) in which the above-described sensitivity is highest is interposed between these wavelengths. If the sign of the slope of the plot is inverted in such a situation, the wavelength range in which the spot intensity f(λ) monotonously increases or monotonously decreases may be narrowed as compared with a case where the slope of the plot is inverted where λa=0.45 μm, and λb=0.65 μm. As a result, according to an aspect of the present disclosure, the degree of change in the spot intensity f(λ) at a focal point on the base surface is smaller than that in a case where the spot intensity f(λ) monotonously increases or monotonously decreases within the above-described wavelength range.

Preferred Examples and Modifications of Spectacle Lens

Preferred examples and modifications of the spectacle lens according to an aspect of the present disclosure will be described below.

It is preferable that at least half the number of the plurality of defocus regions (all defocus regions) are arranged with a same periodicity in plan view. Examples of patterns with the same periodicity include the above-described hexagonal arrangement. The above-described hexagonal arrangement allows a diffraction phenomenon to be preferably used, and can satisfy Equation 1 above. The direction of the periodicity may be a circumferential direction and/or a radial direction. The at least half the number of the plurality of defocus regions is preferably 80% or more, more preferably 90% or more, and further preferably 95% or more. Hereinafter, as described above, preferred examples of "at least half the number of all defocus regions" are 80% or more, 90% or more, and 95% or more in decreasing order of preference, and redundant description thereof will be omitted.

The defocus regions may each have a spherical shape, an aspherical shape, a toric shape, or a shape in which these shapes are mixed (e.g., a central portion of each of the defocus regions may have a spherical shape, and a peripheral portion on the outer side of the central portion may have an aspherical shape). However, since it is preferable that at least half the number of the plurality of defocus regions (all defocus regions) are arranged in a same periodicity in plan view, the defocus regions are each preferably a spherical protruding region.

As for the spot intensity $f(\lambda)$ at a focal point on the base surface, it is preferable that a minimum $f(\lambda)$/maximum $f(\lambda)$ ratio is 0.70 to 1.00 within the range of 0.45 µm≤λ≤0.65 µm. The spot intensity $f(\lambda)$ at a focal point on the base surface is a value normalized with 1 being the spot intensity at a focal point on a base surface assuming that there is no defocus region. Note that an aspect of the present disclosure can be established with this definition alone.

If the maximum value of the absolute value of w/λ is less than 2 (more certainly less than 1.5), the spot intensity $f(\lambda)$ has only one extreme value. In this state, the diffraction order is the first order, and an extreme value is reached only with a reference wavelength. In that state, the minimum $f(\lambda)$/maximum $f(\lambda)$ ratio may be 0.70 to 1.00.

When the "standard apparent sag amount" is set at an incident angle of 30 degrees, it is preferable that the apparent sag amount in a case where the spectacle lens is used in a situation where a light beam is incident at an incident angle of 0 degrees has a minimum $f(\lambda)$/maximum $f(\lambda)$ ratio of 0.70 or more even if the apparent sag amount is set to be smaller than the "standard apparent sag amount" by 10% (the dashed lines in FIGS. 3 to 6).

Equation 1 above includes an inequality sign (i.e., "<"). However, in an alternative aspect, an equal sign may be incorporated (i.e., "≤"). That is, in the alternative aspect, within the wavelength range of 0.45 to 0.65 µm, one of $\{f(\lambda a \times 1.01) - f(\lambda a)\}$, and $\{f(\lambda b \times 1.01) - f(\lambda b)\}$ may be 0. This means that, on the plot on the vertical axis and the horizontal axis of each of FIGS. 3 to 6, the spot intensity $f(\lambda)$ at a focal point on the base surface is constant even if the wavelength increases. That is, if a range in which $f(\lambda)$ is constant exists to a certain degree within a wavelength range of 0.45 to 0.65 µm, the degree of change in $f(\lambda)$ is smaller than that in a case where $f(\lambda)$ continues to monotonously increase or monotonously decrease as described in Comparative Examples 1 and 2 below.

Figure 3:
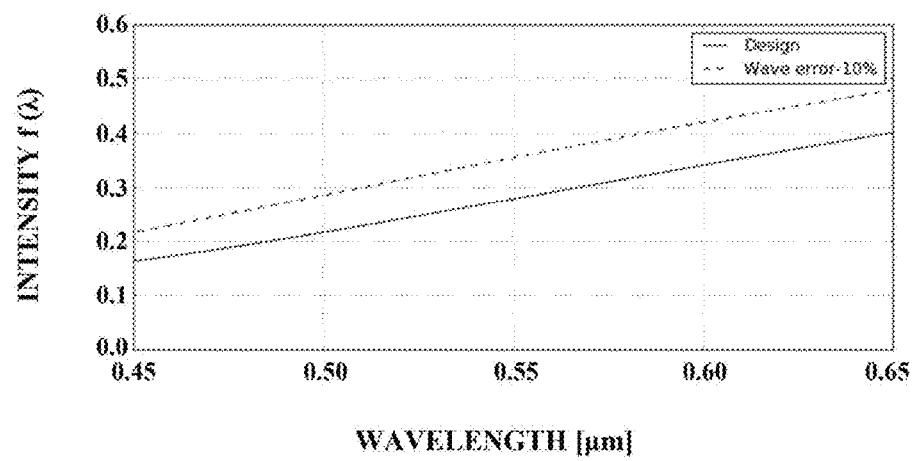
FIG. 3 is a plot showing change in a spot intensity f(λ) (vertical axis: normalized with 1 being the spot intensity at a focal point on a base surface assuming that there is no defocus region) at a focal point on a base surface, with respect to a wavelength λ (horizontal axis: unit [μm]) in a spectacle lens of Comparative Example 1.
Figure 4:
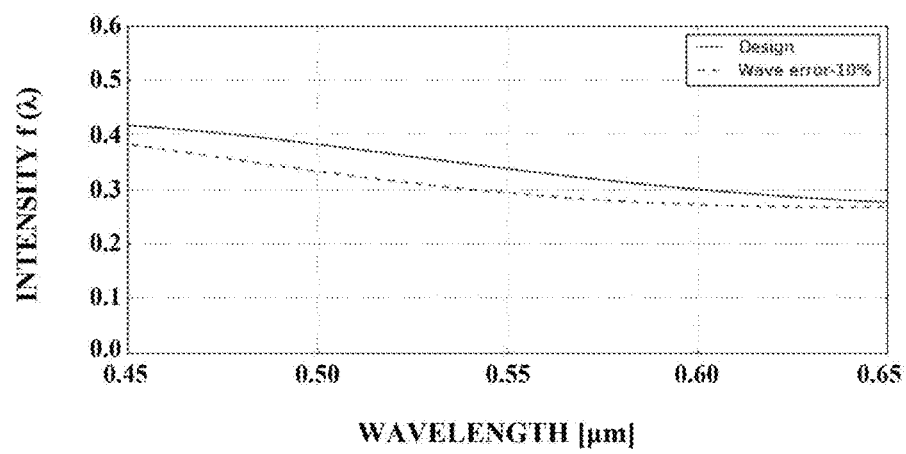
FIG. 4 is a plot showing change in a spot intensity f(λ) (vertical axis: normalized with 1 being the spot intensity at a focal point on a base surface assuming that there is no defocus region) at a focal point on a base surface, with respect to a wavelength λ (horizontal axis: unit [μm]) in a spectacle lens of Comparative Example 2.
Figure 5:
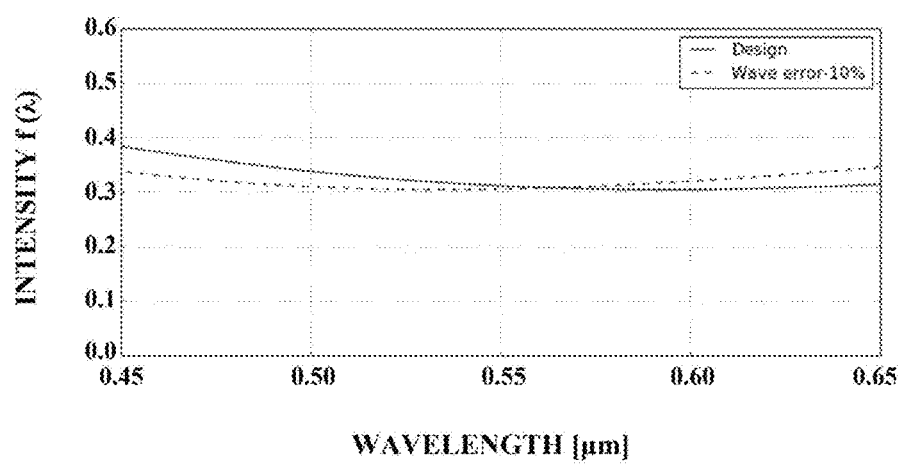
FIG. 5 is a plot showing change in a spot intensity f(λ) (vertical axis: normalized with 1 being the spot intensity at a focal point on a base surface assuming that there is no defocus region) at a focal point on a base surface, with respect to a wavelength λ (horizontal axis: unit [μm]) in a spectacle lens of Example 1.
Figure 6:
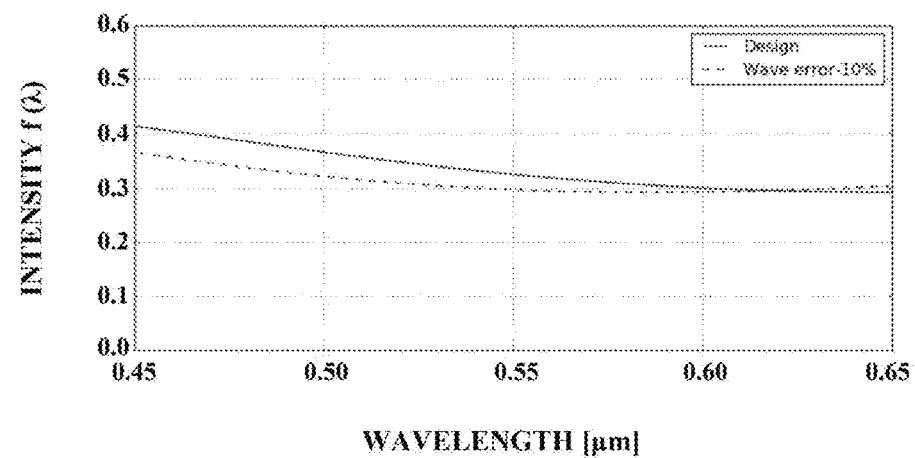
FIG. 6 is a plot showing change in a spot intensity f(λ) (vertical axis: normalized with 1 being the spot intensity at a focal point on a base surface assuming that there is no defocus region) at a focal point on a base surface, with respect to a wavelength λ (horizontal axis: unit [μm]) in a spectacle lens of Example 2.
Figure 7:
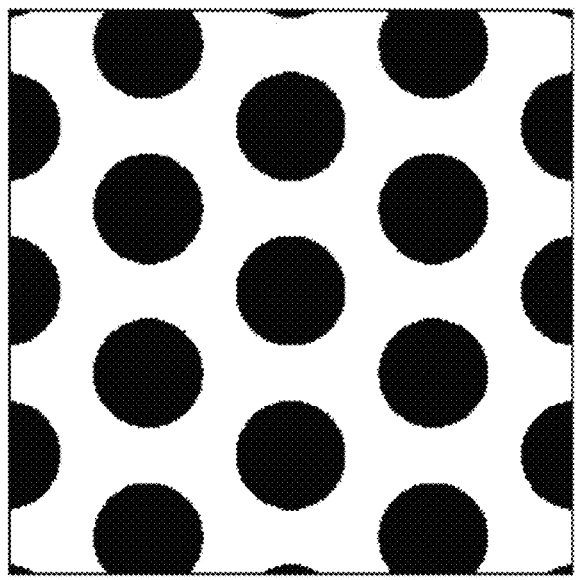
FIG. 7 is a schematic diagram, in plan view, of a portion in which defocus regions (in black in the drawing) are formed, in the spectacle lens of Comparative Example 1.
Figure 8:
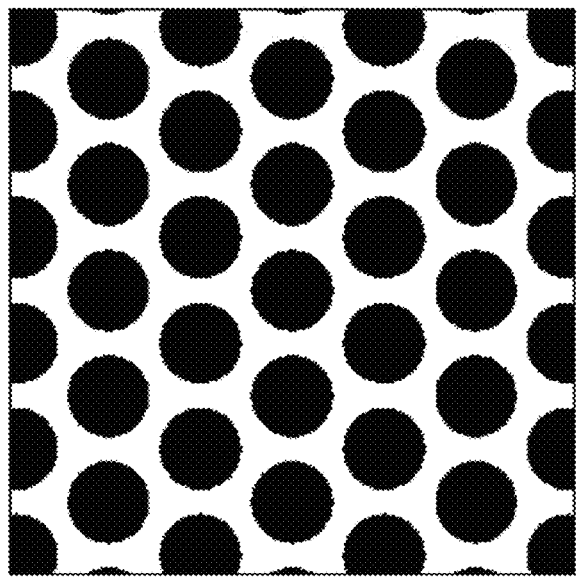
FIG. 8 is a schematic diagram, in plan view, of a portion in which defocus regions (in black in the drawing) are formed in the spectacle lens of Comparative Example 2.

On the plot on the vertical axis and the horizontal axis of each of FIGS. 3 to 6, it is preferable that for a wavelength of 0.45 µm, the slope of the plot is negative when the wavelength increases as shown in FIG. 5 (Example 1) and FIG. 6 (Example 2), and that for a wavelength of 0.65 µm, the slope of the plot is inverted to positive when the wavelength increases. However, this does not exclude that for a wavelength of 0.45 µm, the slope of the plot is positive when the wavelength increases, and that for a wavelength of 0.65 µm, the slope of the plot is inverted to negative when the wavelength increases.

Ultimately, Equation 1 above suggests that the sign of the slope of the plot is inverted between the wavelength λa and the wavelength λb. To extend the content of this suggestion, even if the signs of $\{f(\lambda \times 1.01) - f(\lambda)\}$ for a wavelength of 0.45 µm and a wavelength of 0.65 µm are both positive or both positive, the effects of an embodiment of the present disclosure can be satisfied as long as the sign of $\{f(\lambda \times 1.01) - f(\lambda)\}$ is inverted a plurality of times when the wavelength λ is increased within the range of 0.45 to 0.65 µm. That is, in this case, the degree of change in the spot intensity $f(\lambda)$ at a focal point on the base surface is smaller than that in a case where the spot intensity $f(\lambda)$ continues to monotonously increase or monotonously decrease as described in Comparative Examples 1 and 2.

Taking the above-described modifications into account, an aspect of the present disclosure can be expressed as follows.

"A spectacle lens including: a base region that causes a light beam that has entered from an object-side surface to exit from an eyeball-side surface and to be converged onto a retina through an eyeball; and a plurality of defocus regions in contact with the base region and having a property such that a light beam passing through at least part of the defocus regions enters the retina as divergent light, wherein, when λ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region, an average value of cos $(2\pi w/\lambda)$ in one defocus region is obtained in each of the plurality of defocus regions, $c(\lambda)$ is a gross average of the plurality of average values, an average value of sin $(2\pi w/\lambda)$ in one defocus region is obtained in each of the plurality of defocus regions, $s(\lambda)$ is a gross average of the plurality of average values, and $f(\lambda)$ is equal to $\{1-r+r \cdot c(\lambda)\}^2 + \{s(\lambda)\}^2$, a sign of $\{f(\lambda \times 1.01) - f(\lambda)\}$ is changed (preferably, the sign is inverted) at least once when the wavelength λ is increased within a range of 0.45 µm≤λ≤0.65 µm."

Here, the expression "sign . . . is changed" includes, in addition to cases where the sign is inverted from positive to negative or from negative to positive, a case where a positive value becomes zero (i.e., a positive sign disappears). Similarly, the expression also includes cases where a negative value becomes zero, and where zero becomes a positive or negative value.

The spectacle lens may be a spectacle lens that satisfies at least any of the following conditions.

[Condition 1] The sign of $\{f(\lambda \times 1.01) - f(\lambda)\}$ is inverted at least once when the wavelength λ is increased within the range of 0.45 µm≤λ≤0.65 µm.

[Condition 2] Within the range of 0.45 µm≤λ≤0.65 µm, the wavelength λ includes a range where $\{f(\lambda \times 1.01) - f(\lambda)\} = 0$ is satisfied, and the minimum $f(\lambda)$/maximum $f(\lambda)$ ratio is 0.70 to 1.00.

Note that that the "sign inversion" in Condition 1 includes a case where a wavelength range with a slope of zero is interposed as the wavelength λ is increased, such as a case where the slope is negative, then becomes zero, and then becomes positive.

The value 1.01 in $\{f(\lambda \times 1.01) - f(\lambda)\}$ may be changed as appropriate within the range of 1.001 to 1.1, for example. However, the change in the slope is grasped coarsely when the aforementioned value is too large, and it requires time to perform calculation when the value is too small. The value determined taking these into account is 1.01.

The previously discussed technical idea of the spectacle lens 1 according to an aspect of the present disclosure is also applicable to a spectacle lens 1 having a hypermetropia progression suppressing function. Specifically, each defocus region is configured to have the function for causing a light beam to be converged at a position that is more distant from an object side than a position A (i.e., a position on the back side of the position A) on a retina in a traveling direction of light. By changing "protruding" to "recessed" in the spectacle lens according to an aspect of the present disclosure described thus far, and modifying the spectacle lens such that a light beam is converged at a position on the back side of the predetermined position A, a spectacle lens having a hypermetropia progression suppressing function (abbreviated as a "hypermetropia progression suppression lens") is obtained.

<Specific Examples of Spectacle Lens>

The manner in which the arrangement of the plurality of defocus regions is determined is not particularly limited, and the arrangement can be determined, for example, from the viewpoints of the visibility of the defocus regions from the outside, the design provided by the defocus regions, the refractive power adjustment using the defocus region, and so forth.

Approximately circular defocus regions may be arranged in an island-like configuration (i.e., so as to be spaced apart from each other without being adjacent to each other) around the central portion of the spectacle lens equidistantly in the circumferential direction and the radial direction. As an example of the arrangement of the defocus regions in plan view, the defocus regions may be arranged independent of each other in a dispersed manner such that the center of each protruding region is located at a vertex of an equilateral triangle (the center of each defocus region is disposed at a vertex of a honeycomb structure: hexagonal arrangement). In that case, the interval between the defocus regions may be 1.0 to 2.0 mm. The number of defocus regions may be 100 to 100000.

Each of the defocus regions is configured, for example, as follows. The diameter of the defocus region in plan view is preferably about 0.6 to 2.0 mms. The sag amount (protruding height, protruding amount) of the defocus region is about 0.1 to 10 µm, preferably 0.4 to 2.0 µm. The protruding region has a radius of curvature of 50 to 250 mm, preferably a spherical radius of curvature of about 86 mm.

Although specific numerical values of the defocus power in each of the defocus regions is not particularly limited, the minimum value of the defocus power provided by the defocus region on the spectacle lens is preferably within the range of 0.5 to 4.5 D, and the maximum value thereof is preferably within the range of 3.0 to 10.0 D. The difference between the maximum value and the minimum value is preferably within the range of 1.0 to 5.0 D.

The term "defocus power" refers to a difference between the refractive power in a defocus region, and the refractive power in a portion other than the defocus region. In other words, the term "defocus power" is a difference obtained by subtracting the refractive power of the base portion from the average value of the minimum refractive power and the maximum refractive power at a predetermined location of the defocus region. The present specification illustrates a case where the defocus region is a protruding region.

The term "refractive power" as used herein refers to an average refractive power that is an average value of the refractive power in a direction a in which the refractive power is minimum, and the refractive power in a direction b in which (perpendicular to the direction a) in which the refractive power is maximum.

<Design Method of Spectacle Lens>

The present disclosure is also applicable to a design method of a spectacle lens. Specifically, a spectacle lens is designed by setting conditions so as to satisfy Equation 1 above. The details of the constituent elements of this design method overlap the details described in the Spectacle Lens section, and are thus omitted. Note that the technical idea of the present disclosure is also reflected in the method of manufacturing a spectacle lens designed using this design method.

The technical scope of the present disclosure is not limited to the embodiments described above, but includes various changes and modifications as far as specific effects achieved by the constituent elements of the disclosure and combinations thereof can be derived.

EXAMPLES

Next, the present disclosure will be specifically described by way of examples. The present disclosure is not limited to the following examples.

FIGS. 7 to 10 are schematic diagrams, in plan view, of a portion in which defocus regions (in black in the drawings) are formed, in the spectacle lenses of Comparative Example 1, Comparative Example 2, Example 1, and Example 2 in this order.

Comparative Example 1

In this example, testing was conducted on a spectacle lens satisfying the following conditions.
Radius of curvature: 131.1 mm
Diameter of protruding region: 0.972 mm
Sag amount: 0.90 µm
Center-to-center distance between protruding regions (pitch of hexagonal arrangement): 1.459 mm
Amount of progression w of wavefront: 0.531 µm
Area ratio r: 0.40
Conditions other than the above conditions are as follows. Note that the following conditions were used in this example, as well as in the examples described later.
The protruding regions were also formed at a central portion of the spectacle lens.
The protruding regions each had a spherical shape, and the arrangement of the protruding regions in plan view was a hexagonal arrangement.
As for the area ratio r, the area of a true circle with in a state in which which a total of seven defocus regions (one defocus region at the center, and six defocus regions therearound) in a hexagonal arrangement fit in the true circle in a closest-packed state was regarded as the above-described overall area, and a total area of the defocus regions was regarded as the area of the seven defocus regions.
The prescription power in the base region of the spectacle lens was set to 0.00 D for S (spherical power), and 0.00 D for C (astigmatic power).
The diameter of the spectacle lens in plan view before edging was 100 mm.
No hard coating layer was formed on the spectacle lens.
The refractive index of the spectacle lens was 1.589.
The base curve of the base region was 3.30 D.
The area in which the defocus regions were formed was within a circle having a radius of 17 mm from the lens center.

Comparative Example 2

In this example, testing was conducted on a spectacle lens satisfying the following conditions.
Radius of curvature: 131.1 mm
Diameter of protruding region: 0.724 mm
Sag amount: 0.50 µm Center-to-center distance between protruding regions (pitch of hexagonal arrangement): 0.937 mm
Amount of progression w of wavefront: 0.295 μm
Area ratio r: 0.55

Example 1

In this example, testing was conducted on a spectacle lens satisfying the following conditions.
Radius of curvature: 131.1 mm
Diameter of protruding region: 0.887 mm
Sag amount: 0.75 μm
Center-to-center distance between protruding regions (pitch of hexagonal arrangement): 1.387 mm
Amount of progression w of wavefront: 0.443 μm
Area ratio r: 0.38

Example 2

In this example, testing was conducted on a spectacle lens satisfying the following conditions.
Radius of curvature: 131.1 mm
Diameter of protruding region: 0.950 mm
Sag amount: 0.86 μm
Center-to-center distance between protruding regions (pitch of hexagonal arrangement): 1.448 mm
Amount of progression w of wavefront: 0.507 μm
Area ratio r: 0.39

In the case of Comparative Example 1, Equation 1 above was not satisfied when λa=0.45 μm, and λb=0.65 μm were set. As shown in FIG. 3, even for the design value (the solid line in FIG. 3), when the "standard apparent sag amount" was set at an incident angle of 30 degrees, the spot intensity f(λ) at a focal point on the base surface monotonously increased when the wavelength) was increased, even in a state in which the apparent sag amount when the spectacle lens was used in a situation where a light beam was incident at an incident angle of 0 degrees was smaller than the "standard apparent sag amount" by 10% (the dashed line in FIG. 3). Accordingly, there was a significant degree of change in the spot intensity f(λ) at a focal point on the base surface in response to the change in the wavelength λ.

In the case of Comparative Example 2, Equation 1 above was not satisfied when λa=0.45 μm, and λb=0.65 μm were set. As shown in FIG. 4, even for the design value (the solid line in FIG. 4), when the "standard apparent sag amount" was set at an incident angle of 30 degrees, the spot intensity f(λ) at a focal point on the base surface monotonously decreased when the wavelength λ was increased, even in a state in which the apparent sag amount when the spectacle lens was used in a situation where a light beam was incident at an incident angle of 0 degrees was smaller than the "standard apparent sag amount" by 10% (the dashed line in FIG. 4). Accordingly, there was a significant degree of change in the spot intensity f(λ) at a focal point on the base surface in response to the change in the wavelength λ.

In the case of Example 1, Equation 1 above was satisfied when λa=0.45 μm, and λb=0.65 μm were set. As shown in FIG. 5, even for the design value (the solid line in FIG. 5), when the "standard apparent sag amount" was set at an incident angle of 30 degrees, the spot intensity f(λ) at a focal point on the base surface decreased and thereafter increased when the wavelength λ was increased, even in a state in which the apparent sag amount when the spectacle lens was used in a situation where a light beam was incident at an incident angle of 0 degrees was smaller than the "standard apparent sag amount" by 10% (the dashed line in FIG. 5). In particular, in the case of Example 1, Equation 1 was satisfied even when λa=0.50 μm, and λb=0.60 μm were set in Equation 1. Accordingly, for both the solid line and the dashed line, there was a very small degree of change in the spot intensity f(λ) at a focal point on the base surface in response to the change in the wavelength λ.

In the case of Example 2, Equation 1 above was satisfied when λa=0.45 μm, and λb=0.65 μm were set. As shown in FIG. 6, even for the design value (the solid line in FIG. 6), when the "standard apparent sag amount" was set at an incident angle of 30 degrees, the spot intensity f(λ) at a focal point on the base surface decreased and thereafter increased when the wavelength λ was increased, even in a state in which the apparent sag amount when the spectacle lens was used in a situation where a light beam was incident at an incident angle of 0 degrees was smaller than the "standard apparent sag amount" by 10% (the dashed line in FIG. 6). Accordingly, for both the solid line and the dashed line, there was a small degree of change in the spot intensity f(λ) at a focal point on the base surface in response to the change in the wavelength λ.

As a result of the foregoing, it was found that with each of Examples, it is possible to reduce the degree of change in the spot intensity f(λ) at a focal point on the base surface even if the sag amount has somewhat changed in the defocus regions, or even if the design value of the sag amount is changed in the first place. That is to say, it was found that, with each of Examples, the spot intensity f(λ) at a focal point on the base surface is less likely to be affected by the sag amount of the defocus region.

The invention claimed is:

1. A spectacle lens comprising:
   a base region primarily responsible for causing a light beam that has entered from an object-side surface to exit from an eyeball-side surface and to be converged onto a retina through an eyeball; and
   a plurality of defocus regions in contact with the base region and primarily responsible for causing the light beam to be converged on a front side or a back side of the retina,
   wherein, when λ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region,
   an average value of $\cos(2\pi w/\lambda)$ in one defocus region is obtained in each of the plurality of defocus regions, $c(\lambda)$ is a gross average of the plurality of average values,
   an average value of $\sin(2\pi w/\lambda)$ in one defocus region is obtained in each of the plurality of defocus regions, $s(\lambda)$ is a gross average of the plurality of average values, and $f(\lambda)$ is equal to $\{1-r+r\cdot c(\lambda)\}^2+\{s(\lambda)\}^2$, a sign of $\{f(\lambda\times1.01)-f(\lambda)\}$ is inverted at least once when the wavelength λ is increased within a range of 0.45 μm≤λ≤0.65 μm.

2. The spectacle lens according to claim 1,
   wherein Equation 1 is satisfied when λa=0.45 μm, and λb=0.65 μm are set in Equation 1:

$\{f(\lambda a\times1.01)-f(\lambda a)\}\times\{f(\lambda b\times1.01)-f(\lambda b)\}<0$ (Equation 1).

3. The spectacle lens according to claim 2,
   wherein Equation 1 is satisfied when λa=0.50 μm, and λb=0.60 μm are set in Equation 1.

4. The spectacle lens according to claim 1,
wherein a minimum $f(\lambda)$/maximum $f(\lambda)$ ratio is 0.70 to 1.00 within the range of 0.45 µm≤λ≤0.65 µm.

5. The spectacle lens according to claim 1,
wherein at least half the number of the plurality of defocus regions are arranged with a same periodicity in plan view.

6. The spectacle lens according to claim 5,
wherein at least half the number of the plurality of defocus regions are in a hexagonal arrangement.

7. The spectacle lens according to claim 1,
wherein the spectacle lens is a myopia progression suppression lens or a hypermetropia progression suppression lens.

8. The spectacle lens according to claim 2,
wherein a minimum $f(\lambda)$/maximum $f(\lambda)$ ratio is 0.70 to 1.00 within the range of 0.45 µm≤λ≤0.65 µm.

9. The spectacle lens according to claim 8,
wherein at least half the number of the plurality of defocus regions are arranged with a same periodicity in plan view.

10. The spectacle lens according to claim 9,
wherein at least half the number of the plurality of defocus regions are in a hexagonal arrangement.

11. The spectacle lens according to claim 10,
wherein the spectacle lens is a myopia progression suppression lens or a hypermetropia progression suppression lens.

12. The spectacle lens according to claim 3,
wherein a minimum $f(\lambda)$/maximum $f(\lambda)$ ratio is 0.70 to 1.00 within the range of 0.45 µm≤λ≤0.65 µm.

13. The spectacle lens according to claim 12,
wherein at least half the number of the plurality of defocus regions are arranged with a same periodicity in plan view.

14. The spectacle lens according to claim 13,
wherein at least half the number of the plurality of defocus regions are in a hexagonal arrangement.

15. The spectacle lens according to claim 14,
wherein the spectacle lens is a myopia progression suppression lens or a hypermetropia progression suppression lens.

16. The spectacle lens according to claim 2,
wherein at least half the number of the plurality of defocus regions are arranged with a same periodicity in plan view.

17. The spectacle lens according to claim 16,
wherein at least half the number of the plurality of defocus regions are in a hexagonal arrangement.

18. The spectacle lens according to claim 2,
wherein the spectacle lens is a myopia progression suppression lens or a hypermetropia progression suppression lens.

19. The spectacle lens according to claim 3,
wherein the spectacle lens is a myopia progression suppression lens or a hypermetropia progression suppression lens.

20. A design method of a spectacle lens comprising:
a base region primarily responsible for causing a light beam that has entered from an object-side surface to exit from an eyeball-side surface and to be converged onto a retina through an eyeball; and
a plurality of defocus regions in contact with the base region and primarily responsible for causing the light beam to be converged on a front side or a back side of the retina,
wherein, when $\lambda$ is a wavelength, r is a ratio of a total area of the defocus regions to an overall area in plan view of a portion in which the plurality of defocus regions are provided in the spectacle lens, w is an amount of progression of a wavefront in each of the defocus regions relative to the base region,
an average value of $\cos(2\pi w/\lambda)$ in one defocus region is obtained in each of the plurality of defocus regions, $c(\lambda)$ is a gross average of the plurality of average values,
an average value of $\sin(2\pi w/\lambda)$ in one defocus region is obtained in each of the plurality of defocus regions, $s(\lambda)$ is a gross average of the plurality of average values, and
$f(\lambda)$ is equal to $\{1-r+r\cdot c(\lambda)\}^2+\{s(\lambda)\}$,
the method comprising:
inverting a sign of $\{f(\lambda \times 1.01)-f(\lambda)\}$ at least once when the wavelength $\lambda$ is increased within a range of 0.45 µm≤λ≤0.65 µm.

* * * * *